(12) United States Patent
Kwon et al.

(10) Patent No.: US 8,920,979 B2
(45) Date of Patent: Dec. 30, 2014

(54) CABLE-TYPE SECONDARY BATTERY

(71) Applicant: LG Chem, Ltd., Seoul (KR)

(72) Inventors: Yo-Han Kwon, Daejeon (KR); Sang-Wook Woo, Daejeon (KR); Hye-Ran Jung, Busan (KR); Je-Young Kim, Daejeon (KR); Heon-Cheol Shin, Busan (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/022,773

(22) Filed: Sep. 10, 2013

(65) Prior Publication Data

US 2014/0011065 A1 Jan. 9, 2014

Related U.S. Application Data

(63) Continuation of application No. PCT/KR2012/008824, filed on Oct. 25, 2012.

(30) Foreign Application Priority Data

Oct. 25, 2011 (KR) .................. 10-2011-0109563
Oct. 25, 2012 (KR) .................. 10-2012-0118925

(51) Int. Cl.
*H01M 4/70* (2006.01)
*H01M 4/76* (2006.01)
*H01M 6/08* (2006.01)

(52) U.S. Cl.
USPC ............ 429/238; 429/164; 429/209; 429/233

(58) Field of Classification Search
None
See application file for complete search history.

(56) References Cited

U.S. PATENT DOCUMENTS

| 2004/0062958 A1 | 4/2004 | Facchi et al. |
| 2010/0203372 A1 | 8/2010 | Kim et al. |
| 2012/0009331 A1 | 1/2012 | Kwon et al. |

FOREIGN PATENT DOCUMENTS

| JP | 09-007629 A | 1/1997 |
| KR | 2003-0081499 A | 10/2003 |
| KR | 20050099903 A | 10/2005 |
| KR | 0742739 | 7/2007 |
| KR | 0804411 | 2/2008 |
| KR | 20090009598 A | 1/2009 |
| KR | 20110090768 A | 8/2011 |
| WO | 2005098994 A1 | 10/2005 |

OTHER PUBLICATIONS

International Search Report for Application No. PCT/KR2012/008824 dated Mar. 28, 2013.

*Primary Examiner* — Cynthia K. Walls
(74) *Attorney, Agent, or Firm* — Lerner, David, Littenberg, Krumholz & Mentlik, LLP

(57) ABSTRACT

The present invention relates to a cable-type secondary battery having a horizontal cross section of a predetermined shape and extending longitudinally, comprising: an inner electrode having an inner current collector and an inner electrode active material layer surrounding the outer surface of the inner current collector; a separation layer surrounding the outer surface of the inner electrode to prevent a short circuit between electrodes; and an outer electrode surrounding the outer surface of the separation layer, and having an outer electrode active material layer, an open-structured outer current collector and a conductive paste layer. The outer electrode having a conductive paste layer and an open-structured outer current collector according to the present invention has good flexibility to improve the flexibility of a cable-type secondary battery having the same. Also, the conductive paste layer is made of a light material, and thus can contribute to the lightening of the cable-type secondary battery.

33 Claims, 3 Drawing Sheets

CABLE-TYPE SECONDARY BATTERY

CROSS-REFERENCE TO RELATED APPLICATION

This application is a continuation of International Application No. PCT/KR2012/008824 filed on Oct. 25, 2012, which claims priority under 35 USC 119(a) to Korean Patent Application No. 10-2011-0109563 filed in the Republic of Korea on Oct. 25, 2011, and Korean Patent Application No. 10-2012-0118925 filed in the Republic of Korea on Oct. 25, 2012, the disclosures thereof are incorporated herein by reference.

TECHNICAL FIELD

The present invention relates to a cable-type secondary battery, which can freely change in shape, and more particularly to a cable-type secondary battery comprising a conductive paste layer and an open-structured outer current collector.

BACKGROUND ART

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to start vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop linear batteries having a very high ratio of length to cross-sectional diameter. Korean Patent No. 0804411 discloses a linear battery consisting of a plurality of cathodes and anodes and separators interposed between each cathode and each anode. Korean Patent No. 0742739 discloses a thread-type flexible battery consisting of cathode threads and anode threads. However, these batteries have insufficient flexibility. Also, if the outer current collector of these batteries is deformed by external force, a short circuit may occur due to the contact between the outer and inner current collectors.

DISCLOSURE

Technical Problem

The present invention is designed to solve the problems of the prior art, and therefore it is an object of the present invention to provide a secondary battery having a new linear structure, which can easily change in shape, maintain excellent stability and performances as a secondary battery, and prevent a short circuit due to the deformation of an outer current collector.

Technical Solution

In order to achieve the objects, in accordance with one aspect of the present invention, there is provided a cable-type secondary battery having a horizontal cross section of a predetermined shape and extending longitudinally, comprising: an inner electrode having an inner current collector and an inner electrode active material layer surrounding the outer surface of the inner current collector; a separation layer surrounding the outer surface of the inner electrode to prevent a short circuit between electrodes; and an outer electrode surrounding the outer surface of the separation layer, and having an outer electrode active material layer, an open-structured outer current collector and a conductive paste layer.

In the present invention, the open-structured outer current collector may be in the form of a wound wire, a wound sheet or a mesh.

In the outer electrode, the outer electrode active material layer may be formed to surround the outer surface of the separation layer, the open-structured outer current collector may be formed to surround the outer surface of the outer electrode active material layer, and the conductive paste layer may be formed to surround the outer surface of the open-structured outer current collector; the outer electrode active material layer may be formed to surround the outer surface of the separation layer, the conductive paste layer may be formed to surround the outer surface of the outer electrode active material layer, and the open-structured outer current collector may be formed to surround the outer surface of the conductive paste layer; the outer electrode active material layer may be formed to surround the outer surface of the separation layer, the open-structured outer current collector may be formed to surround the outer surface of the outer electrode active material layer, and the conductive paste layer may be formed to surround the outer surface of the open-structured outer current collector and to come into contact with the outer electrode active material layer; the outer electrode active material layer may be formed to surround the outer surface of the separation layer, the open-structured outer current collector may be formed to be included inside the outer electrode active material layer by being covered therein and to surround the outer surface of the separation layer with spacing apart therefrom, and the conductive paste layer may be formed to surround the outer surface of the outer electrode active material layer; or the outer electrode active material layer may be formed to surround the outer surface of the separation layer, the conductive paste layer may be formed to surround the outer surface of the outer electrode active material layer, and the open-structured outer current collector may be formed to be included inside the conductive paste layer by being covered therein and to surround the outer surface of the outer electrode active material layer with spacing apart therefrom.

Also, in the outer electrode, the conductive paste layer may be formed to surround the outer surface of the separation layer, the open-structured outer current collector may be formed to surround the outer surface of the conductive paste layer, and the outer electrode active material layer may be formed to surround the outer surface of the open-structured outer current collector; the conductive paste layer may be formed to surround the outer surface of the separation layer, the outer electrode active material layer may be formed to surround the outer surface of the conductive paste layer, and the open-structured outer current collector may be formed to surround the outer surface of the outer electrode active material layer; the conductive paste layer may be formed to surround the outer surface of the separation layer, the open-structured outer current collector may be formed to surround the outer surface of the conductive paste layer, and the outer electrode active material layer may be formed to surround the outer surface of the open-structured outer current collector and to come into contact with the conductive paste layer; the conductive paste layer may be formed to surround the outer surface of the separation layer, the open-structured outer current collector may be formed to be included inside the conductive paste layer by being covered therein and to surround the outer surface of the separation layer with spacing apart therefrom, and the outer electrode active material layer may be formed to surround the outer surface of the conductive paste layer; or the conductive paste layer may be formed to surround the outer surface of the separation layer, the outer electrode active material layer may be formed to surround the outer surface of the conductive paste layer, and the open-structured outer current collector may be formed to be included inside the outer electrode active material layer by being covered therein and to surround the outer surface of the conductive paste layer with spacing apart therefrom.

In addition, in the outer electrode, the open-structured outer current collector may be formed to surround the outer surface of the separation layer, the conductive paste layer may be formed to surround the outer surface of the open-structured outer current collector, and the outer electrode active material layer may be formed to surround the outer surface of the conductive paste layer; the open-structured outer current collector may be formed to surround the outer surface of the separation layer, the conductive paste layer may be formed to surround the outer surface of the open-structured outer current collector and to come into contact with the separation layer, and the outer electrode active material layer may be formed to surround the outer surface of the conductive paste layer; the open-structured outer current collector may be formed to surround the outer surface of the separation layer, the outer electrode active material layer may be formed to surround the outer surface of the open-structured outer current collector, and the conductive paste layer may be formed to surround the outer surface of the outer electrode active material layer; or the open-structured outer current collector may be formed to surround the outer surface of the separation layer, the outer electrode active material layer may be formed to surround the outer surface of the open-structured outer current collector and to come into contact with the separation layer, and the conductive paste layer may be formed to surround the outer surface of the outer electrode active material layer.

The inner current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

The conductive material used in the inner current collector may be selected from the group consisting of polyacetylene, polyaniline, polypyrrole, polythiophene, polysulfurnitride, indium tin oxide (ITO), silver, palladium, nickel, and a mixture thereof.

The conductive polymer used in the inner current collector may be selected from the group consisting of polyacetylene, polyaniline, polypyrrole, polythiophene, polysulfurnitride, and a mixture thereof.

The open-structured outer current collector may be made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

The conductive material used in the outer current collector may be selected from the group consisting of polyacetylene, polyaniline, polypyrrole, polythiophene, polysulfurnitride, indium tin oxide (ITO), silver, palladium, nickel, and a mixture thereof.

The conductive polymer used in the outer current collector may be selected from the group consisting of polyacetylene, polyaniline, polypyrrole, polythiophene, polysulfurnitride, and a mixture thereof.

Meanwhile, the conductive paste layer may be a metal paste layer or a carbon paste layer.

The metal paste layer may comprise metal powders selected from Ni, Al, Au, Ag, Al, Pd/Ag, Cr, Ta, Cu, Ba, ITO and a mixture thereof, and a binder.

The binder used in the metal paste layer may be selected from an acryl-based resin, a vinyl-based resin, hydroxycellulose, methyl cellulose, nitrocellulose, ethylene cellulose, a modified resin of said resins, and a mixture thereof.

Also, the carbon paste layer may comprise carbon powders selected from graphite, carbon black, carbon nanotube and a mixture thereof, and a binder.

The binder used in the carbon paste layer may be selected from an acryl-based resin, a vinyl-based resin, hydroxycellulose, methyl cellulose, nitrocellulose, ethylene cellulose, a modified resin of said resins, and a mixture thereof.

In the present invention, the inner electrode may be an anode and the outer electrode may be a cathode, or the inner electrode may be a cathode and the outer electrode may be an anode.

When the inner electrode of the present invention is an anode and the outer electrode is a cathode, the inner electrode active material layer may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; a complex of the metals and carbon; and a mixture thereof, and the outer electrode active material layer may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

Alternatively, when the inner electrode is a cathode and the outer electrode is an anode, the inner electrode active material layer may comprise an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof, and the outer electrode active material layer may comprise an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; a complex of the metals and carbon; and a mixture thereof.

In the present invention, the separation layer may be an electrolyte layer or a separator.

The electrolyte layer may comprise an electrolyte selected from a gel polymer electrolyte using PEO, PVdF, PMMA, PVdF-HFP, PAN, or PVAc; and a solid electrolyte using PEO, polypropylene oxide (PPO), polyether imine (PEI), polyethylene sulphide (PES), or polyvinyl acetate (PVAc).

The electrolyte layer may further comprise a lithium salt.

The lithium salt may be selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

The separator may be a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer.

Further, in accordance with another aspect of the present invention, there is provided a cable-type secondary battery having a horizontal cross section of a predetermined shape and extending longitudinally, comprising: an inner electrode having two or more electrodes arranged in parallel to each other, each electrode comprising an inner current collector and an inner electrode active material layer surrounding the outer surface of the inner current collector; a separation layer surrounding the outer surface of the inner electrodes to prevent a short circuit between electrodes; and an outer electrode surrounding the outer surface of the separation layer, and having an outer electrode active material layer, an open-structured outer current collector and a conductive paste layer.

Furthermore, in accordance with still another aspect of the present invention, there is provided a cable-type secondary battery having a horizontal cross section of a predetermined shape and extending longitudinally, comprising: an inner electrode having two or more electrodes arranged in parallel to each other, each electrode comprising an inner current collector, an inner electrode active material layer surrounding the outer surface of the inner current collector and a separation layer surrounding the outer surface of the inner electrode active material layer; and an outer electrode surrounding the outer surface of the inner electrode, and having an outer electrode active material layer, an open-structured outer current collector and a conductive paste layer.

In the outer electrode, the outer electrode active material layer may be formed to surround the outer surface of the inner electrode, the open-structured outer current collector may be formed to surround the outer surface of the outer electrode active material layer, and the conductive paste layer may be formed to surround the outer surface of the open-structured outer current collector; the outer electrode active material layer may be formed to surround the outer surface of the inner electrode, the conductive paste layer may be formed to surround the outer surface of the outer electrode active material layer, and the open-structured outer current collector may be formed to surround the outer surface of the conductive paste layer; the outer electrode active material layer may be formed to surround the outer surface of the inner electrode, the open-structured outer current collector may be formed to surround the outer surface of the outer electrode active material layer, and the conductive paste layer may be formed to surround the outer surface of the open-structured outer current collector and to come into contact with the outer electrode active material layer; the outer electrode active material layer may be formed to surround the outer surface of the inner electrode, the open-structured outer current collector may be formed to be included inside the outer electrode active material layer by being covered therein and to surround the outer surface of the inner electrode with spacing apart therefrom, and the conductive paste layer may be formed to surround the outer surface of the outer electrode active material layer; or the outer electrode active material layer may be formed to surround the outer surface of the inner electrode, the conductive paste layer may be formed to surround the outer surface of the outer electrode active material layer, and the open-structured outer current collector may be formed to be included inside the conductive paste layer by being covered therein and to surround the outer surface of the outer electrode active material layer with spacing apart therefrom.

Also, in the outer electrode, the conductive paste layer may be formed to surround the outer surface of the inner electrode, the open-structured outer current collector may be formed to surround the outer surface of the conductive paste layer, and the outer electrode active material layer may be formed to surround the outer surface of the open-structured outer current collector; the conductive paste layer may be formed to surround the outer surface of the inner electrode, the outer electrode active material layer may be formed to surround the outer surface of the conductive paste layer, and the open-structured outer current collector may be formed to surround the outer surface of the outer electrode active material layer; the conductive paste layer may be formed to surround the outer surface of the inner electrode, the open-structured outer current collector may be formed to surround the outer surface of the conductive paste layer, and the outer electrode active material layer may be formed to surround the outer surface of the open-structured outer current collector and to come into contact with the conductive paste layer; the conductive paste layer may be formed to surround the outer surface of the inner electrode, the open-structured outer current collector may be formed to be included inside the conductive paste layer by being covered therein and to surround the outer surface of the inner electrode with spacing apart therefrom, and the outer electrode active material layer may be formed to surround the outer surface of the conductive paste layer; or the conductive paste layer may be formed to surround the outer surface of the inner electrode, the outer electrode active material layer may be formed to surround the outer surface of the conductive paste layer, and the open-structured outer current collector may be formed to be included inside the outer electrode active material layer by being covered therein and to surround the outer surface of the conductive paste layer with spacing apart therefrom.

In addition, in the outer electrode, the open-structured outer current collector may be formed to surround the outer surface of the inner electrode, the conductive paste layer may be formed to surround the outer surface of the open-structured outer current collector, and the outer electrode active material layer may be formed to surround the outer surface of the conductive paste layer; the open-structured outer current collector may be formed to surround the outer surface of the inner electrode, the conductive paste layer may be formed to surround the outer surface of the open-structured outer current collector and to come into contact with the inner electrode, and the outer electrode active material layer may be formed to surround the outer surface of the conductive paste layer; the open-structured outer current collector may be formed to surround the outer surface of the inner electrode, the outer electrode active material layer may be formed to surround the outer surface of the open-structured outer current collector, and the conductive paste layer may be formed to surround the outer surface of the outer electrode active material layer; or the open-structured outer current collector may be formed to surround the outer surface of the inner electrode, the outer electrode active material layer may be formed to surround the outer surface of the open-structured outer current collector and to come into contact with the inner electrode, and the conductive paste layer may be formed to surround the outer surface of the outer electrode active material layer.

Advantageous Effects

In accordance with the present invention, an open-structured outer current collector having good flexibility can be used in a cable-type secondary battery to improve the flexibility of the battery. Also, the conductive paste layer is made of a light material, and thus can contribute to the lightening of the cable-type secondary battery. In addition, the open-structured outer current collector of the present invention is less subjected to excessive deformation such as bending or severe folding, due to its structural characteristic, even if excessive external force is applied to the cable-type battery, thereby preventing a short circuit due to the contact with the inner current collector and the release of an active material. Further, the outer electrode comprising the conductive paste layer has good contact characteristic with an active material, thereby preventing the release of the active material.

DESCRIPTION OF THE DRAWINGS

The accompanying drawings illustrate preferred embodiments of the present invention and, together with the foregoing disclosure, serve to provide further understanding of the technical spirit of the present invention. However, the present invention is not to be construed as being limited to the drawings.

BEST MODE

Hereinafter, the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Figure 1:
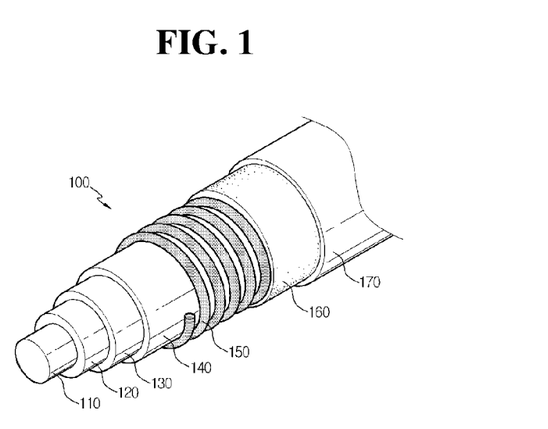
FIG. 1 shows a cable-type secondary battery having one inner electrode, a wound outer current collector and a conductive paste layer, in accordance with a preferred embodiment of the present invention.
Figure 2:
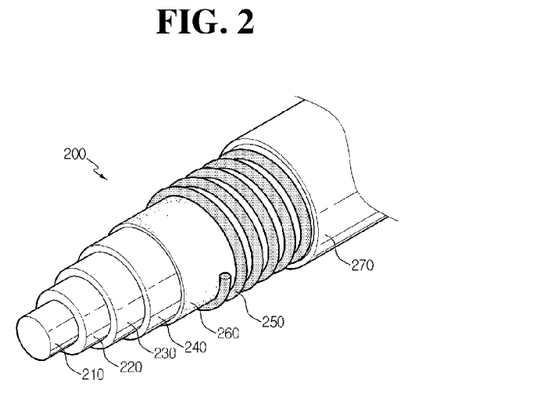
FIG. 2 shows a cable-type secondary battery having one inner electrode, a conductive paste layer and a wound outer current collector, in accordance with a preferred embodiment of the present invention.
Figure 3:
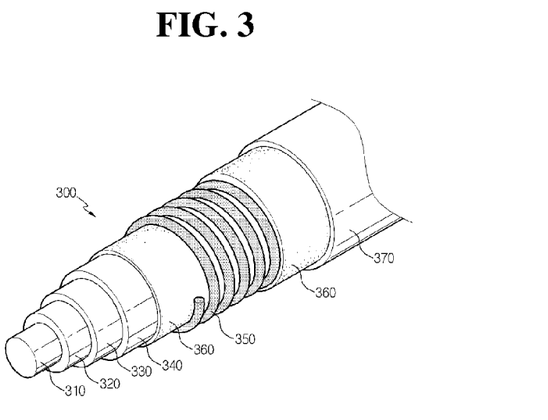
FIG. 3 shows a cable-type secondary battery having one inner electrode and a wound outer current collector covered inside a conductive paste layer, in accordance with a preferred embodiment of the present invention.

FIGS. 1 to 3 schematically show a cable-type secondary battery having one inner electrode, an open-structured outer current collector and a conductive paste layer, in accordance with the embodiments of the present invention. However, the configurations illustrated in the drawings and the embodiments are just preferable examples for the purpose of illustrations only, not intended to limit the scope of the disclosure, so it should be understood that other equivalents and modifications could be made thereto without departing from the spirit and scope of the disclosure.

Referring to FIGS. 1 to 3, a cable-type secondary battery 100, 200, 300, which has a horizontal cross section of a predetermined shape and extends longitudinally, comprises an inner electrode having an inner current collector 110, 210, 310 and an inner electrode active material layer 120, 220, 320 surrounding the outer surface of the inner current collector 110, 210, 310; a separation layer 130, 230, 330 surrounding the outer surface of the inner electrode 120, 220, 320 to prevent a short circuit between electrodes; and an outer electrode surrounding the outer surface of the separation layer, and having an outer electrode active material layer 140, 240, 340, an open-structured outer current collector 150, 250, 350, and a conductive paste layer 160, 260, 360. The term 'a predetermined shape' used herein is not limited to any particular shape, and refers to any shape that does not damage the nature of the present invention. The cable-type secondary battery of the present invention has a horizontal cross section of a predetermined shape, a linear structure, which extends in the longitudinal direction, and flexibility, so it can freely change in shape.

Also, the term 'open-structured' used herein means that a structure has an open boundary surface through which a substance may be transferred freely from the inside of the structure to the outside thereof. The open-structured outer current collector may be in the form of a wound wire, a wound sheet or a mesh, but is not limited thereto.

The inner electrode of the present invention consists of the linear inner current collector 110, 210, 310, and the inner electrode active material layer 120, 220, 320 surrounding the outer surface of the inner current collector 110, 210, 310. Such an inner electrode is surrounded with the separation layer 130, 230, 330 for preventing a short circuit between electrodes on the outer surface thereof.

On the outer surface of the separation layer 130, 230, 330, an outer electrode is formed.

In the present invention, the outer electrode may be formed in various embodiments depending on the disposition of the outer electrode active material layer, the open-structured outer current collector and the conductive paste layer, which come into contact with the separation layer.

According to a first embodiment of the present invention, the outer electrode active material layer may first surround the outer surface of the separation layer.

Particularly, the outer electrode may have the outer electrode active material layer 140 surrounding the outer surface of the separation layer 130, the open-structured outer current collector 150 surrounding the outer surface of the outer electrode active material layer 140, and the conductive paste layer 160 surrounding the outer surface of the open-structured outer current collector 150.

For example, in FIG. 1 showing a cable-type secondary battery having an open structured outer current collector in the form of a wound wire, the outer electrode active material layer 140 is formed to surround the outer surface of the separation layer 130, the wire-type outer current collector 150 is wound on the outer surface of the outer electrode active material layer 140, and the conductive paste layer 160 is formed to surround the outer surface of the wire-type and open-structured outer current collector 150.

Also, in FIG. 2, the outer electrode active material layer 240 is formed to surround the outer surface of the separation layer 230, the conductive paste layer 260 is formed to surround the outer surface of the outer electrode active material layer 240, and the wire-type outer current collector 250 is wound on the outer surface of the conductive paste layer 260.

In addition, in FIG. 3, the outer electrode active material layer 340 is formed to surround the outer surface of the separation layer 330, the conductive paste layer 360 is formed to surround the outer surface of the outer electrode active material layer 340, and the wound open-structured outer current collector is formed to be included inside the conductive paste layer 360 by being covered therein and to surround the outer surface of the outer electrode active material layer 340 with spacing apart therefrom.

Such an open-structured outer current collector 150, which is wound in a spring form on the outer surface of the outer electrode active material layer 140, has good flexibility and elasticity. Accordingly, the wound wire-type outer current collector is less subjected to excessive deformation such as bending or severe folding, due to its structural characteristic, even if excessive external force is applied to the cable-type battery, thereby preventing a short circuit due to the contact with the inner current collector, and also preventing the release of an active material.

As the open-structured outer current collector, a wound sheet form or a mesh form may also exhibit the same effect as the above-mentioned wound wire form.

As the first embodiment of the present invention, besides the above-mentioned structure, the outer electrode may be formed in a structure having the outer electrode active material layer surrounding the outer surface of the separation layer, the open-structured outer current collector surrounding the outer surface of the outer electrode active material layer, and the conductive paste layer surrounding the outer surface of the open-structured outer current collector and coming into contact with the outer electrode active material layer; or a structure having the outer electrode active material layer surrounding the outer surface of the separation layer, the open-structured outer current collector being included inside the outer electrode active material layer by being covered therein and surrounding the outer surface of the separation layer with spacing apart therefrom, and the conductive paste layer surrounding the outer surface of the outer electrode active material layer.

According to a second embodiment of the present invention, the conductive paste layer may first surround the outer surface of the separation layer.

That is, the outer electrode may be configured with a structure having the conductive paste layer surrounding the outer surface of the separation layer, the open-structured outer current collector surrounding the outer surface of the conductive paste layer, and the outer electrode active material layer surrounding the outer surface of the open-structured outer current collector; a structure having the conductive paste layer surrounding the outer surface of the separation layer, the outer electrode active material layer surrounding the outer surface of the conductive paste layer, and the open-structured outer current collector surrounding the outer surface of the outer electrode active material layer; a structure having the conductive paste layer surrounding the outer surface of the separation layer, the open-structured outer current collector surrounding the outer surface of the conductive paste layer, and the outer electrode active material layer surrounding the outer surface of the open-structured outer current collector and coming into contact with the conductive paste layer; a structure having the conductive paste layer surrounding the outer surface of the separation layer, the open-structured outer current collector being included inside the conductive paste layer by being covered therein and surrounding the outer surface of the separation layer with spacing apart therefrom, and the outer electrode active material layer surrounding the outer surface of the conductive paste layer; or a structure having the conductive paste layer surrounding the outer surface of the separation layer, the outer electrode active material layer surrounding the outer surface of the conductive paste layer, and the open-structured outer current collector being included inside the outer electrode active material layer by being covered therein and surrounding the outer surface of the conductive paste layer with spacing apart therefrom.

According to a third embodiment of the present invention, the open-structured outer current collector may first surround the outer surface of the separation layer.

That is, the outer electrode may be configured with a structure having the open-structured outer current collector surrounding the outer surface of the separation layer, the conductive paste layer surrounding the outer surface of the open-structured outer current collector, and the outer electrode active material layer surrounding the outer surface of the conductive paste layer; a structure having the open-structured outer current collector surrounding the outer surface of the separation layer, the conductive paste layer surrounding the outer surface of the open-structured outer current collector and coming into contact with the separation layer, and the outer electrode active material layer surrounding the outer surface of the conductive paste layer; a structure having the open-structured outer current collector surrounding the outer surface of the separation layer, the outer electrode active material layer surrounding the outer surface of the open-structured outer current collector, and the conductive paste layer surrounding the outer surface of the outer electrode active material layer; or a structure having the open-structured outer current collector surrounding the outer surface of the separation layer, the outer electrode active material layer surrounding the outer surface of the open-structured outer current collector and coming into contact with the separation layer, and the conductive paste layer surrounding the outer surface of the outer electrode active material layer.

Meanwhile, the conductive paste layer 160 is made of a conductive paste which refers to a paste capable of forming a general coating layer and used in a dried substrate when an electric current flows. The conductive paste is obtained by dispersing the powders of a conductive material in a binder. The conductive paste layer 160 formed from such a conductive paste has good flexibility, and thus can improve the flexibility of a cable-type secondary battery using the conductive paste layer. Also, the conductive paste layer 160 formed with such a conductive paste has a relatively light weight as compared with a current collector made of a metal, to reduce the weight of a cable-type secondary battery. In addition, since the conductive paste layer 160 formed with such a conductive paste has good flexibility, even though an excessive external force is applied to the cable-type secondary battery of the present invention, little or no excessive deformation such as bending or severe folding occurs, and thus a short circuit due to the contact with the inner current collector can be minimized. Also, when the conductive paste layer 160 is formed by applying the conductive paste on the outer surface of the outer electrode active material layer 140, according to its physical property, it exhibits good contact characteristic with the outer electrode active material layer 140, thereby effectively preventing the release of an electrode active material, which may occur from battery deformation by external force. Further, the conductive paste layer 160 is applied together with the open-structured outer current collector 150 to enhance insufficient electric contact between the outer current collector 150 and the outer electrode active material layer 140.

In the present invention, the conductive paste layer may be a metal paste layer or a carbon paste layer. The metal paste layer preferably comprises metal powders selected from Ni, Al, Au, Ag, Al, Pd/Ag, Cr, Ta, Cu, Ba, ITO and a mixture thereof, and a binder. Examples of the binder which may be used in the present invention include an acryl-based resin, a vinyl-based resin, hydroxycellulose, methyl cellulose, nitrocellulose, ethylene cellulose, and a modified resin thereof, but is not particularly limited thereto. Meanwhile, the carbon paste layer preferably comprises carbon powders selected from graphite, carbon black, carbon nanotube and a mixture thereof, and a binder. Optionally, the carbon paste may further comprise a conductive material. Examples of the binder which may be used in the present invention include an acryl-based resin, a vinyl-based resin, hydroxycellulose, methyl cellulose, nitrocellulose, ethylene cellulose, and a modified resin thereof, but is not particularly limited thereto.

Meanwhile, the inner current collector is preferably made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer. The open-structured outer current collector is preferably made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

Such a current collector serves to collect electrons generated by electrochemical reaction of the active material or to supply electrons required for the electrochemical reaction. In general, the current collector is made of a metal such as copper or aluminum. Especially, when the current collector is made of a non-conductive polymer treated with a conductive material on the surface thereof or a conductive polymer, the current collector has a relatively higher flexibility than the current collector made of a metal such as copper or aluminum. Also, a polymer current collector may be used instead of the metal current collector to reduce the weight of the battery.

The conductive material may include polyacetylene, polyaniline, polypyrrole, polythiophene, polysulfurnitride, indium tin oxide (ITO), copper, silver, palladium, nickel, etc. The conductive polymer may include polyacetylene, polyaniline, polypyrrole, polythiophene, polysulfurnitride, etc. However, the non-conductive polymer used for the current collector is not particularly limited to its kinds.

The inner electrode may be an anode and the outer electrode may be a cathode. Alternatively, the inner electrode may be a cathode and the outer electrode may be an anode.

In the present invention, the electrode active material layer allows ions to move through the current collector, and the movement of ions is caused by the interaction of ions such as intercalation/deintercalation of ions into and from the electrolyte layer.

Such an electrode active material layer may be divided into an anode active material layer and a cathode active material layer.

Specifically, when the inner electrode is an anode and the outer electrode is a cathode, the inner electrode active material layer becomes an anode active material layer and may be made of an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; a complex of the metals (Me) and carbon; and a mixture thereof, and the outer electrode active material layer becomes a cathode active material layer and may be made of an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

Alternatively, when the inner electrode is a cathode and the outer electrode is an anode, the inner electrode active material layer becomes a cathode active material layer and the outer electrode active material layer becomes an anode active material layer.

The separation layer of the present invention may be an electrolyte layer or a separator.

The electrolyte layer serving as an ion channel may be made of a gel-type polymer electrolyte using PEO, PVdF, PVdF-HFP, PMMA, PAN or PVAc, or a solid electrolyte using PEO, polypropylene oxide (PPO), polyethylene imine (PEI), polyethylene sulfide (PES) or polyvinyl acetate (PVAc). The matrix of the solid electrolyte is preferably formed using a polymer or a ceramic glass as the backbone. In the case of typical polymer electrolytes, the ions move very slowly in terms of reaction rate, even when the ionic conductivity is satisfied. Thus, the gel-type polymer electrolyte which facilitates the movement of ions is preferably used compared to the solid electrolyte. The gel-type polymer electrolyte has poor mechanical properties and thus may comprise a porous support or a cross-linked polymer to improve poor mechanical properties. The electrolyte layer of the present invention can serve as a separator, and thus an additional separator may be omitted.

The electrolyte layer of the present invention may further comprise a lithium salt. The lithium salt can improve an ionic conductivity and response time. Non-limiting examples of the lithium salt may include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, and lithium tetraphenylborate.

Examples of the separator may include, but is not limited to, a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer.

Also, the cable-type secondary battery of the present invention has a protection coating. The protection coating is an insulator and is formed to surround the outer current collector, thereby protecting the electrodes against moisture in the air and external impacts. The protection coating may be made of conventional polymer resins, for example, PVC, HDPE or epoxy resins.

Hereinafter, a cable-type secondary battery according to one embodiment of the present invention and the manufacture thereof will be briefly explained with reference to FIG. 1.

The cable-type secondary battery 100 according to one embodiment of the present invention comprises an inner electrode having the inner current collector 110 having a horizontal cross section of a predetermined shape and extending longitudinally, and the inner electrode active material layer 120 surrounding the outer surface of the inner current collector 110; the separation layer 130 surrounding the outer surface of the inner electrode to prevent a short circuit between electrodes; and the outer electrode having the outer electrode active material layer 140 surrounding the outer surface of the separation layer 130; the wound wire-type outer current collector 150 surrounding the outer surface of the outer electrode active material layer 140, and the conductive paste layer 160 surrounding the outer surface of the wound wire-type outer current collector 150.

First, the inner current collector 110 is provided in the form of a wire, and then an inner electrode active material layer 120 is formed on the surface of the inner current collector 110 by way of coating. The coating may be carried out by various conventional methods, for example, by an electroplating process or an anodic oxidation process. Also, in order to maintain constant intervals, an electrode slurry containing an active material may be discontinuously applied by way of an extrusion-coating using an extruder. In addition, the electrode slurry containing an active material may be applied by way of dip coating or extrusion-coating using an extruder.

Subsequently, the separation layer 130 which is an electrolyte layer is formed to surround the inner electrode active material layer 120. The method for forming the separation layer 130, an electrolyte layer, is not particularly limited, but an extrusion coating method is preferably used to facilitate the manufacturing process due to the nature of the linear cable-type secondary battery.

On the outer surface of the separation layer 130 formed by the coating of an electrolyte, the outer electrode active material layer 140 is formed by way of coating. The coating method of the inner electrode active material layer 120 may be identically applied to the outer electrode active material layer 140.

Next, the wire-type outer current collector is wound on the outer surface of the outer electrode active material layer 140 to form the wound wire-type outer current collector 150. Then, a silver paste is applied on the outer surface of the wound wire-type outer current collector having an open structure, to form the conductive paste layer 160. Thereby, an electrode assembly is prepared.

Finally, the protection coating 170 is formed to surround the outer surface of the electrode assembly. The protection coating 170 is an insulator and is formed on the outermost surface for the purpose of protecting the electrodes against moisture in the air and external impacts. As the protection coating 170, conventional polymer resins, for example, PVC, HDPE and epoxy resins may be used.

Hereinafter, another embodiment of the present invention will be explained with reference to FIGS. 4 to 7.

One embodiment of the present invention, provides a cable-type secondary battery having a horizontal cross section of a predetermined shape and extending longitudinally, which comprises an inner electrode having two or more electrodes arranged in parallel to each other, each electrode comprising an inner current collector and an inner electrode active material layer surrounding the outer surface of the inner current collector; a separation layer surrounding the outer surface of the inner electrodes to prevent a short circuit between electrodes; and an outer electrode surrounding the outer surface of the separation layer, and having an outer electrode active material layer, an open-structured outer current collector and a conductive paste layer.

Figure 4:
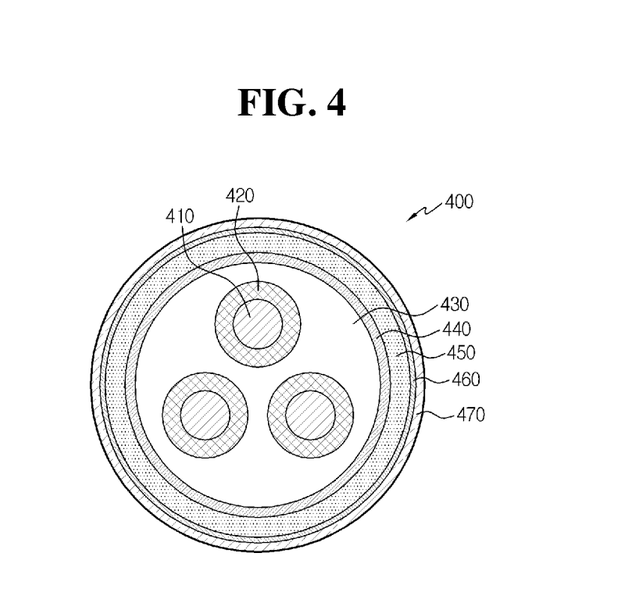
FIG. 4 shows a cable-type secondary battery having multiple inner electrodes, an open-structured outer current collector and a conductive paste layer, in accordance with a preferred embodiment of the present invention.
Figure 5:
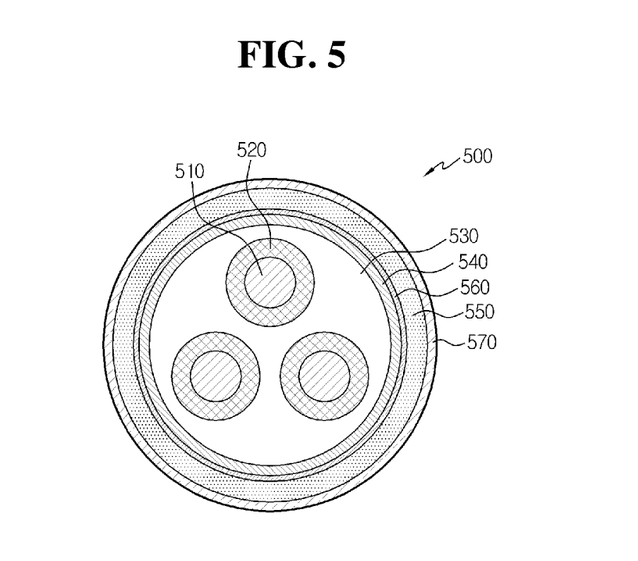
FIG. 5 shows a cable-type secondary battery having multiple inner electrodes, a conductive paste layer and a wound outer current collector, in accordance with a preferred embodiment of the present invention.

First, referring to FIG. 4, the cable-type secondary battery 400 according to one embodiment of the present invention comprises two or more inner electrodes arranged parallel to each other, each inner electrode having an inner current collector 410, and an inner electrode active material layer 420 surrounding the outer surface of the inner current collector 410; a separation layer 430 surrounding the outer surface of the inner electrode to prevent a short circuit between electrodes; and an outer electrode having an outer electrode active material layer 440 surrounding the outer surface of the separation layer 430; a wound wire-type and open-structured outer current collector 450 surrounding the outer surface of the outer electrode active material layer 440, and a conductive paste layer 460 surrounding the outer surface of the wound wire-type and open-structured outer current collector 450. Such a cable-type secondary battery 400 has the inner electrode consisting of multiple electrodes, thereby allowing controlling the balance between a cathode and anode and preventing a short circuit. Also, referring to FIG. 5, the cable-type secondary battery 500 of the present invention comprises an outer electrode having an outer electrode active material layer 540/a conductive paste layer 560/a wound wire-type and open-structured outer current collector 550 which are formed in order.

Furthermore, the outer electrode may be formed in various embodiments depending on the disposition of the outer electrode active material layer, the open-structured outer current collector and the conductive paste layer, which come into contact with the separation layer, as mentioned above.

Meanwhile, another embodiment of the present invention provides a cable-type secondary battery having a horizontal cross section of a predetermined shape and extending longitudinally, which comprises an inner electrode having two or more electrodes arranged in parallel to each other, each electrode comprising an inner current collector, an inner electrode active material layer surrounding the outer surface of the inner current collector and a separation layer surrounding the outer surface of the inner electrode active material layer; and an outer electrode surrounding the outer surface of the inner electrode, and having an outer electrode active material layer, an open-structured outer current collector and a conductive paste layer.

Figure 6:
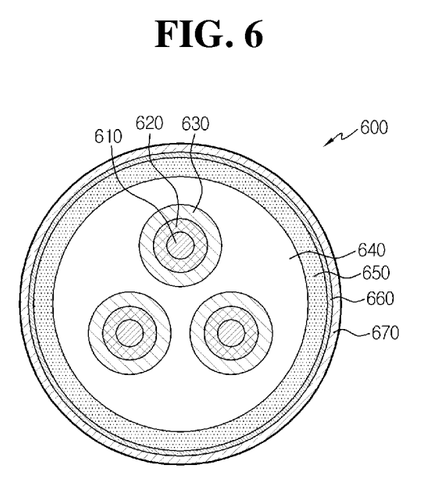
FIG. 6 shows a cable-type secondary battery having multiple inner electrodes which each have a separation layer, an open-structured outer current collector and a conductive paste layer, in accordance with a preferred embodiment of the present invention.
Figure 7:
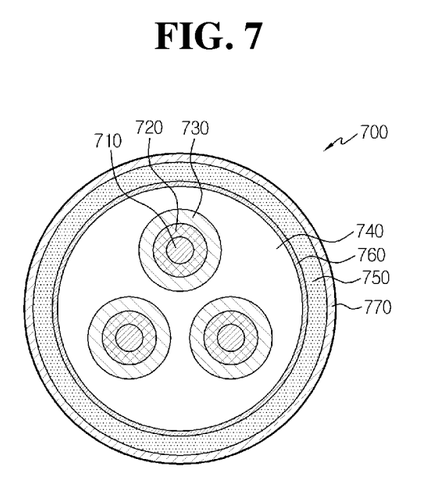
FIG. 7 shows a cable-type secondary battery having multiple inner electrodes which each have a separation layer, a conductive paste layer and a wound outer current collector, in accordance with a preferred embodiment of the present invention.

First, referring to FIG. 6, the cable-type secondary battery 600 according to one embodiment of the present invention comprises an inner electrode having two or more electrodes arranged in parallel to each other, each electrode comprising an inner current collector 610, an inner electrode active material layer 620 surrounding the outer surface of the inner current collector 610 and a separation layer 630 surrounding the outer surface of the inner electrode active material layer 620; and an outer electrode having an outer electrode active material layer 640 surrounding the outer surface of the inner electrode; a wound wire-type and open-structured outer current collector 650 surrounding the outer surface of the outer electrode active material layer 640, and a conductive paste layer 660 surrounding the outer surface of the wound wire-type and open-structured outer current collector 650. Such a cable-type secondary battery 600 has the inner electrode consisting of multiple electrodes, thereby allowing controlling the balance between a cathode and anode and preventing a short circuit. Also, referring to FIG. 7, the cable-type secondary battery 700 of the present invention comprises an outer electrode having an outer electrode active material layer 740/a conductive paste layer 760/a wound wire-type and open-structured outer current collector 750 which are formed in order.

Also, the outer electrode may be configured with a structure having the outer electrode active material layer surrounding the outer surface of the inner electrode, the open-structured outer current collector surrounding the outer surface of the outer electrode active material layer, and the conductive paste layer surrounding the outer surface of the open-structured outer current collector and coming into contact with the outer electrode active material layer; a structure having the outer electrode active material layer surrounding the outer surface of the inner electrode, the open-structured outer current collector being included inside the outer electrode active material layer by being covered therein and surrounding the outer surface of the inner electrode with spacing apart therefrom, and the conductive paste layer surrounding the outer surface of the outer electrode active material layer; or a structure having the outer electrode active material layer surrounding the outer surface of the inner electrode, the conductive paste layer surrounding the outer surface of the outer electrode active material layer, and the open-structured outer current collector being included inside the conductive paste layer by being covered therein and surrounding the outer surface of the outer electrode active material layer with spacing apart therefrom.

Alternatively, the conductive paste layer may first surround the outer surface of the inner electrode.

That is, the outer electrode may also be configured with a structure having the conductive paste layer surrounding the outer surface of the inner electrode, the open-structured outer current collector surrounding the outer surface of the conductive paste layer, and the outer electrode active material layer surrounding the outer surface of the open-structured outer current collector; a structure having the conductive paste layer surrounding the outer surface of the inner electrode, the outer electrode active material layer surrounding the outer surface of the conductive paste layer, and the open-structured outer current collector surrounding the outer surface of the outer electrode active material layer; a structure having the conductive paste layer surrounding the outer surface of the inner electrode, the open-structured outer current collector surrounding the outer surface of the conductive paste layer, and the outer electrode active material layer surrounding the outer surface of the open-structured outer current collector and coming into contact with the conductive paste layer; a structure having the conductive paste layer surrounding the outer surface of the inner electrode, the open-structured outer current collector being included inside the conductive paste layer by being covered therein and surrounding the outer surface of the inner electrode with spacing apart therefrom, and the outer electrode active material layer surrounding the outer surface of the conductive paste layer; or a structure having the conductive paste layer surrounding the outer surface of the inner electrode, the outer electrode active material layer surrounding the outer surface of the conductive paste layer, and the open-structured outer current collector being included inside the outer electrode active material layer by being covered therein and surrounding the outer surface of the conductive paste layer with spacing apart therefrom.

Meanwhile, the open-structured outer current collector may first surround the outer surface of the inner electrode.

That is, the outer electrode may also be configured with a structure having the open-structured outer current collector surrounding the outer surface of the inner electrode, the conductive paste layer surrounding the outer surface of the open-structured outer current collector, and the outer electrode active material layer surrounding the outer surface of the conductive paste layer; a structure having the open-structured outer current collector surrounding the outer surface of the inner electrode, the conductive paste layer surrounding the outer surface of the open-structured outer current collector and coming into contact with the inner electrode, and the outer electrode active material layer surrounding the outer surface of the conductive paste layer; a structure having the open-structured outer current collector surrounding the outer surface of the inner electrode, the outer electrode active material layer surrounding the outer surface of the open-structured outer current collector, and the conductive paste layer surrounding the outer surface of the outer electrode active material layer; or a structure having the open-structured outer current collector surrounding the outer surface of the inner electrode, the outer electrode active material layer surrounding the outer surface of the open-structured outer current collector and coming into contact with the inner electrode, and the conductive paste layer surrounding the outer surface of the outer electrode active material layer.

What is claimed is:

1. A cable-type secondary battery having a horizontal cross section of a predetermined shape and extending longitudinally, comprising:
   an inner electrode having an inner current collector and an inner electrode active material layer surrounding the outer surface of the inner current collector;
   a separation layer surrounding the outer surface of the inner electrode to prevent a short circuit between electrodes; and
   an outer electrode surrounding the outer surface of the separation layer, and having an outer electrode active material layer, an open-structured outer current collector and a conductive paste layer.

2. The cable-type secondary battery according to claim 1, wherein the open-structured outer current collector is in the form of a wound wire, a wound sheet or a mesh.

3. The cable-type secondary battery according to claim 1, wherein in the outer electrode,
the outer electrode active material layer is formed to surround the outer surface of the separation layer, the open-structured outer current collector is formed to surround the outer surface of the outer electrode active material layer, and the conductive paste layer is formed to surround the outer surface of the open-structured outer current collector;
the outer electrode active material layer is formed to surround the outer surface of the separation layer, the conductive paste layer is formed to surround the outer surface of the outer electrode active material layer, and the open-structured outer current collector is formed to surround the outer surface of the conductive paste layer;
the outer electrode active material layer is formed to surround the outer surface of the separation layer, the open-structured outer current collector is formed to surround the outer surface of the outer electrode active material layer, and the conductive paste layer is formed to surround the outer surface of the open-structured outer current collector and to come into contact with the outer electrode active material layer;
the outer electrode active material layer is formed to surround the outer surface of the separation layer, the open-structured outer current collector is formed to be included inside the outer electrode active material layer by being covered therein and to surround the outer surface of the separation layer with spacing apart therefrom, and the conductive paste layer is formed to surround the outer surface of the outer electrode active material layer; or
the outer electrode active material layer is formed to surround the outer surface of the separation layer, the conductive paste layer is formed to surround the outer surface of the outer electrode active material layer, and the open-structured outer current collector is formed to be included inside the conductive paste layer by being covered therein and to surround the outer surface of the outer electrode active material layer with spacing apart therefrom.

4. The cable-type secondary battery according to claim 1, wherein in the outer electrode,
the conductive paste layer is formed to surround the outer surface of the separation layer, the open-structured outer current collector is formed to surround the outer surface of the conductive paste layer, and the outer electrode active material layer is formed to surround the outer surface of the open-structured outer current collector;
the conductive paste layer is formed to surround the outer surface of the separation layer, the outer electrode active material layer is formed to surround the outer surface of the conductive paste layer, and the open-structured outer current collector is formed to surround the outer surface of the outer electrode active material layer;
the conductive paste layer is formed to surround the outer surface of the separation layer, the open-structured outer current collector is formed to surround the outer surface of the conductive paste layer, and the outer electrode active material layer is formed to surround the outer surface of the open-structured outer current collector and to come into contact with the conductive paste layer;
the conductive paste layer is formed to surround the outer surface of the separation layer, the open-structured outer current collector is formed to be included inside the conductive paste layer by being covered therein and to surround the outer surface of the separation layer with spacing apart therefrom, and the outer electrode active material layer is formed to surround the outer surface of the conductive paste layer; or
the conductive paste layer is formed to surround the outer surface of the separation layer, the outer electrode active material layer is formed to surround the outer surface of the conductive paste layer, and the open-structured outer current collector is formed to be included inside the outer electrode active material layer by being covered therein and to surround the outer surface of the conductive paste layer with spacing apart therefrom.

5. The cable-type secondary battery according to claim 1, wherein in the outer electrode,
the open-structured outer current collector is formed to surround the outer surface of the separation layer, the conductive paste layer is formed to surround the outer surface of the open-structured outer current collector, and the outer electrode active material layer is formed to surround the outer surface of the conductive paste layer;
the open-structured outer current collector is formed to surround the outer surface of the separation layer, the conductive paste layer is formed to surround the outer surface of the open-structured outer current collector and to come into contact with the separation layer, and the outer electrode active material layer is formed to surround the outer surface of the conductive paste layer;
the open-structured outer current collector is formed to surround the outer surface of the separation layer, the outer electrode active material layer is formed to surround the outer surface of the open-structured outer current collector, and the conductive paste layer is formed to surround the outer surface of the outer electrode active material layer; or
the open-structured outer current collector is formed to surround the outer surface of the separation layer, the outer electrode active material layer is formed to surround the outer surface of the open-structured outer current collector and to come into contact with the separation layer, and the conductive paste layer is formed to surround the outer surface of the outer electrode active material layer.

6. The cable-type secondary battery according to claim 1, wherein the inner current collector is made of stainless steel, aluminum, nickel, titanium, sintered carbon, or copper; stainless steel treated with carbon, nickel, titanium or silver on the surface thereof; an aluminum-cadmium alloy; a non-conductive polymer treated with a conductive material on the surface thereof; or a conductive polymer.

7. The cable-type secondary battery according to claim 6, wherein the conductive material is selected from the group consisting of polyacetylene, polyaniline, polypyrrole, polythiophene, polysulfurnitride, indium tin oxide (ITO), silver, palladium, nickel, and a mixture thereof.

8. The cable-type secondary battery according to claim 6, wherein the conductive polymer is selected from the group consisting of polyacetylene, polyaniline, polypyrrole, polythiophene, polysulfurnitride, and a mixture thereof.

9. The cable-type secondary battery according to claim 1, wherein the open-structured outer current collector is made of stainless steel, aluminum, nickel, titanium, sintered carbon, or copper; stainless steel treated with carbon, nickel, titanium or silver on the surface thereof; an aluminum-cadmium alloy;

a non-conductive polymer treated with a conductive material on the surface thereof; or a conductive polymer.

10. The cable-type secondary battery according to claim 9, wherein the conductive material is selected from the group consisting of polyacetylene, polyaniline, polypyrrole, polythiophene, polysulfurnitride, indium tin oxide (ITO), silver, palladium, nickel, and a mixture thereof.

11. The cable-type secondary battery according to claim 9, wherein the conductive polymer is selected from the group consisting of polyacetylene, polyaniline, polypyrrole, polythiophene, polysulfurnitride, and a mixture thereof.

12. The cable-type secondary battery according to claim 1, wherein the conductive paste layer is a metal paste layer or a carbon paste layer.

13. The cable-type secondary battery according to claim 12, wherein the metal paste layer comprises metal powders selected from Ni, Al, Au, Ag, Al, Pd/Ag, Cr, Ta, Cu, Ba, ITO and a mixture thereof, and a binder.

14. The cable-type secondary battery according to claim 13, wherein the binder is selected from an acryl-based resin, a vinyl-based resin, hydroxycellulose, methyl cellulose, nitrocellulose, ethylene cellulose, a modified resin of said resins, and a mixture thereof.

15. The cable-type secondary battery according to claim 12, wherein the carbon paste layer comprises carbon powders selected from graphite, carbon black, carbon nanotube and a mixture thereof, and a binder.

16. The cable-type secondary battery according to claim 15, wherein the binder is selected from an acryl-based resin, a vinyl-based resin, hydroxycellulose, methyl cellulose, nitrocellulose, ethylene cellulose, a modified resin of said resins, and a mixture thereof.

17. The cable-type secondary battery according to claim 1, wherein the inner electrode is an anode and the outer electrode is a cathode, or the inner electrode is a cathode and the outer electrode is an anode.

18. The cable-type secondary battery according to claim 1, wherein when the inner electrode is an anode and the outer electrode is a cathode,
the inner electrode active material layer comprises an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; a complex of the metals (Me) and carbon; and a mixture thereof, and
the outer electrode active material layer comprises an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof.

19. The cable-type secondary battery according to claim 1, wherein when the inner electrode is a cathode and the outer electrode is an anode,
the inner electrode active material layer comprises an active material selected from the group consisting of $LiCoO_2$, $LiNiO_2$, $LiMn_2O_4$, $LiCoPO_4$, $LiFePO_4$, $LiNiMnCoO_2$, $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z are each independently an atomic fraction of oxide-forming elements, in which $0 \leq x < 0.5$, $0 \leq y < 0.5$, $0 \leq z < 0.5$, and $x+y+z \leq 1$), and a mixture thereof, and
the outer electrode active material layer comprises an active material selected from the group consisting of natural graphite, artificial graphite, or carbonaceous material; lithium-titanium complex oxide (LTO), and metals (Me) including Si, Sn, Li, Zn, Mg, Cd, Ce, Ni and Fe; alloys of the metals; oxides (MeOx) of the metals; a complex of the metals (Me) and carbon; and a mixture thereof.

20. The cable-type secondary battery according to claim 1, wherein the separation layer is an electrolyte layer or a separator.

21. The cable-type secondary battery according to claim 20, wherein the electrolyte layer comprises an electrolyte selected from a gel polymer electrolyte using PEO, PVdF, PVdF-HFP, PMMA, PAN, or PVAc; and a solid electrolyte using PEO, polypropylene oxide (PPO), polyether imine (PEI), polyethylene sulphide (PES), or polyvinyl acetate (PVAc).

22. The cable-type secondary battery according to claim 21, wherein the electrolyte layer further comprises a lithium salt.

23. The cable-type secondary battery according to claim 22, wherein the lithium salt is selected from the group consisting of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, lithium tetraphenylborate, and a mixture thereof.

24. The cable-type secondary battery according to claim 20, wherein the separator is a porous substrate made of a polyolefin-based polymer selected from the group consisting of ethylene homopolymers, propylene homopolymers, ethylene-butene copolymers, ethylene-hexene copolymers, and ethylene-methacrylate copolymers; a porous substrate made of a polymer selected from the group consisting of polyesters, polyacetals, polyamides, polycarbonates, polyimides, polyether ether ketones, polyether sulfones, polyphenylene oxides, polyphenylene sulfides and polyethylene naphthalenes; or a porous substrate made of a mixture of inorganic particles and a binder polymer.

25. A cable-type secondary battery having a horizontal cross section of a predetermined shape and extending longitudinally, comprising:
an inner electrode having two or more electrodes arranged in parallel to each other, each electrode comprising an inner current collector and an inner electrode active material layer surrounding the outer surface of the inner current collector;
a separation layer surrounding the outer surface of the inner electrodes to prevent a short circuit between electrodes; and
an outer electrode surrounding the outer surface of the separation layer, and having an outer electrode active material layer, an open-structured outer current collector and a conductive paste layer.

26. The cable-type secondary battery according to claim 25, wherein the open-structured outer current collector is in the form of a wound wire, a wound sheet or a mesh.

27. The cable-type secondary battery according to claim 25, wherein in the outer electrode,
the outer electrode active material layer is formed to surround the outer surface of the separation layer, the open-structured outer current collector is formed to surround the outer surface of the outer electrode active material layer, and the conductive paste layer is formed to surround the outer surface of the open-structured outer current collector;

the outer electrode active material layer is formed to surround the outer surface of the separation layer, the conductive paste layer is formed to surround the outer surface of the outer electrode active material layer, and the open-structured outer current collector is formed to surround the outer surface of the conductive paste layer;

the outer electrode active material layer is formed to surround the outer surface of the separation layer, the open-structured outer current collector is formed to surround the outer surface of the outer electrode active material layer, and the conductive paste layer is formed to surround the outer surface of the open-structured outer current collector and to come into contact with the outer electrode active material layer;

the outer electrode active material layer is formed to surround the outer surface of the separation layer, the open-structured outer current collector is formed to be included inside the outer electrode active material layer by being covered therein and to surround the outer surface of the separation layer with spacing apart therefrom, and the conductive paste layer is formed to surround the outer surface of the outer electrode active material layer; or the outer electrode active material layer is formed to surround the outer surface of the separation layer, the conductive paste layer is formed to surround the outer surface of the outer electrode active material layer, and the open-structured outer current collector is formed to be included inside the conductive paste layer by being covered therein and to surround the outer surface of the outer electrode active material layer with spacing apart therefrom.

28. The cable-type secondary battery according to claim 25, wherein in the outer electrode, the conductive paste layer is formed to surround the outer surface of the separation layer, the open-structured outer current collector is formed to surround the outer surface of the conductive paste layer, and the outer electrode active material layer is formed to surround the outer surface of the open-structured outer current collector;

the conductive paste layer is formed to surround the outer surface of the separation layer, the outer electrode active material layer is formed to surround the outer surface of the conductive paste layer, and the open-structured outer current collector is formed to surround the outer surface of the outer electrode active material layer;

the conductive paste layer is formed to surround the outer surface of the separation layer, the open-structured outer current collector is formed to surround the outer surface of the conductive paste layer, and the outer electrode active material layer is formed to surround the outer surface of the open-structured outer current collector and to come into contact with the conductive paste layer;

the conductive paste layer is formed to surround the outer surface of the separation layer, the open-structured outer current collector is formed to be included inside the conductive paste layer by being covered therein and to surround the outer surface of the separation layer with spacing apart therefrom, and the outer electrode active material layer is formed to surround the outer surface of the conductive paste layer; or the conductive paste layer is formed to surround the outer surface of the separation layer, the outer electrode active material layer is formed to surround the outer surface of the conductive paste layer, and the open-structured outer current collector is formed to be included inside the outer electrode active material layer by being covered therein and to surround the outer surface of the conductive paste layer with spacing apart therefrom.

29. The cable-type secondary battery according to claim 25, wherein in the outer electrode, the open-structured outer current collector is formed to surround the outer surface of the separation layer, the conductive paste layer is formed to surround the outer surface of the open-structured outer current collector, and the outer electrode active material layer is formed to surround the outer surface of the conductive paste layer;

the open-structured outer current collector is formed to surround the outer surface of the separation layer, the conductive paste layer is formed to surround the outer surface of the open-structured outer current collector and to come into contact with the separation layer, and the outer electrode active material layer is formed to surround the outer surface of the conductive paste layer;

the open-structured outer current collector is formed to surround the outer surface of the separation layer, the outer electrode active material layer is formed to surround the outer surface of the open-structured outer current collector, and the conductive paste layer is formed to surround the outer surface of the outer electrode active material layer; or the open-structured outer current collector is formed to surround the outer surface of the separation layer, the outer electrode active material layer is formed to surround the outer surface of the open-structured outer current collector and to come into contact with the separation layer, and the conductive paste layer is formed to surround the outer surface of the outer electrode active material layer.

30. A cable-type secondary battery having a horizontal cross section of a predetermined shape and extending longitudinally, comprising:

an inner electrode having two or more electrodes arranged in parallel to each other, each electrode comprising an inner current collector, an inner electrode active material layer surrounding the outer surface of the inner current collector and a separation layer surrounding the outer surface of the inner electrode active material layer; and an outer electrode surrounding the outer surface of the inner electrode, and having an outer electrode active material layer, an open-structured outer current collector and a conductive paste layer.

31. The cable-type secondary battery according to claim 30, wherein in the outer electrode, the outer electrode active material layer is formed to surround the outer surface of the inner electrode, the open-structured outer current collector is formed to surround the outer surface of the outer electrode active material layer, and the conductive paste layer is formed to surround the outer surface of the open-structured outer current collector;

the outer electrode active material layer is formed to surround the outer surface of the inner electrode, the conductive paste layer is formed to surround the outer surface of the outer electrode active material layer, and the open-structured outer current collector is formed to surround the outer surface of the conductive paste layer;

the outer electrode active material layer is formed to surround the outer surface of the inner electrode, the open-structured outer current collector is formed to surround the outer surface of the outer electrode active material layer, and the conductive paste layer is formed to surround the outer surface of the open-structured outer current collector and to come into contact with the outer electrode active material layer;

the outer electrode active material layer is formed to surround the outer surface of the inner electrode, the open-structured outer current collector is formed to be included inside the outer electrode active material layer by being covered therein and to surround the outer surface of the inner electrode with spacing apart therefrom, and the conductive paste layer is formed to surround the outer surface of the outer electrode active material layer; or the outer electrode active material layer is formed to surround the outer surface of the inner electrode, the conductive paste layer is formed to surround the outer surface of the outer electrode active material layer, and the open-structured outer current collector is formed to be included inside the conductive paste layer by being covered therein and to surround the outer surface of the outer electrode active material layer with spacing apart therefrom.

32. The cable-type secondary battery according to claim 30, wherein in the outer electrode, the conductive paste layer is formed to surround the outer surface of the inner electrode, the open-structured outer current collector is formed to surround the outer surface of the conductive paste layer, and the outer electrode active material layer is formed to surround the outer surface of the open-structured outer current collector;

the conductive paste layer is formed to surround the outer surface of the inner electrode, the outer electrode active material layer is formed to surround the outer surface of the conductive paste layer, and the open-structured outer current collector is formed to surround the outer surface of the outer electrode active material layer;

the conductive paste layer is formed to surround the outer surface of the inner electrode, the open-structured outer current collector is formed to surround the outer surface of the conductive paste layer, and the outer electrode active material layer is formed to surround the outer surface of the open-structured outer current collector and to come into contact with the conductive paste layer;

the conductive paste layer is formed to surround the outer surface of the inner electrode, the open-structured outer current collector is formed to be included inside the conductive paste layer by being covered therein and to surround the outer surface of the inner electrode with spacing apart therefrom, and the outer electrode active material layer is formed to surround the outer surface of the conductive paste layer; or the conductive paste layer is formed to surround the outer surface of the inner electrode, the outer electrode active material layer is formed to surround the outer surface of the conductive paste layer, and the open-structured outer current collector is formed to be included inside the outer electrode active material layer by being covered therein and to surround the outer surface of the conductive paste layer with spacing apart therefrom.

33. The cable-type secondary battery according to claim 30, wherein in the outer electrode, the open-structured outer current collector is formed to surround the outer surface of the inner electrode, the conductive paste layer is formed to surround the outer surface of the open-structured outer current collector, and the outer electrode active material layer is formed to surround the outer surface of the conductive paste layer;

the open-structured outer current collector is formed to surround the outer surface of the inner electrode, the conductive paste layer is formed to surround the outer surface of the open-structured outer current collector and to come into contact with the inner electrode, and the outer electrode active material layer is formed to surround the outer surface of the conductive paste layer;

the open-structured outer current collector is formed to surround the outer surface of the inner electrode, the outer electrode active material layer is formed to surround the outer surface of the open-structured outer current collector, and the conductive paste layer is formed to surround the outer surface of the outer electrode active material layer; or the open-structured outer current collector is formed to surround the outer surface of the inner electrode, the outer electrode active material layer is formed to surround the outer surface of the open-structured outer current collector and to come into contact with the inner electrode, and the conductive paste layer is formed to surround the outer surface of the outer electrode active material layer.

* * * * *